United States Patent [19]

Bodnar

[11] Patent Number: 5,539,729
[45] Date of Patent: Jul. 23, 1996

[54] METHOD FOR OVERLOAD CONTROL IN A PACKET SWITCH THAT PROCESSES PACKET STREAMS HAVING DIFFERENT PRIORITY LEVELS

[75] Inventor: Bohdan L. Bodnar, Park Ridge, Ill.

[73] Assignee: AT&T Corp., Murray Hill, N.J.

[21] Appl. No.: 353,429

[22] Filed: Dec. 9, 1994

[51] Int. Cl.⁶ .................. H04B 7/216; H04L 12/56
[52] U.S. Cl. .................. 370/18; 370/60; 370/85.6; 370/94.1
[58] Field of Search .................. 370/18, 60, 60.1, 370/61, 85.2, 85.3, 85.6, 85.8, 94.1, 94.2, 95.2, 110.1; 340/825.08, 825.5, 825.51, 825.52, 825.54; 375/200, 205

[56] References Cited

U.S. PATENT DOCUMENTS

| | | | |
|---|---|---|---|
| 4,517,670 | 5/1985 | Ulug | 370/85.6 |
| 4,707,831 | 11/1987 | Weir et al. | 370/85.6 |
| 4,942,569 | 7/1990 | Maeno | 370/60 |
| 4,953,157 | 8/1990 | Franklin et al. | 370/60 |
| 4,977,557 | 12/1990 | Phung et al. | 370/85.6 |
| 5,115,430 | 5/1992 | Hahne et al. | 370/85.6 |
| 5,311,513 | 5/1994 | Ahmadi et al. | 370/85.6 |
| 5,390,176 | 2/1995 | Schoute et al. | 370/60.1 |

*Primary Examiner*—Alpus H. Hsu
*Attorney, Agent, or Firm*—Michael B. Johannesen

[57] ABSTRACT

A system and method that controls potential overload of packet switches when the packet switch has multiple packet streams with different priority levels. A counter is associated with the higher priority packet stream, so that when the counter reaches a predetermined number, the higher priority packet stream is disabled, so that the lower priority packet stream may be processed. When the counter reaches the predetermined number, interrupts are disabled, thus inhibiting processing of the higher priority packet stream. Advantageously, a predetermined number of polled packets are processed before interrupts are enabled.

10 Claims, 7 Drawing Sheets

METHOD FOR OVERLOAD CONTROL IN A PACKET SWITCH THAT PROCESSES PACKET STREAMS HAVING DIFFERENT PRIORITY LEVELS

TECHNICAL FIELD

This invention relates to the field of packet switching, and, more specifically, to providing overload control in packet switches that process multiple packet streams, wherein the packet streams have different processing priority levels.

BACKGROUND OF THE INVENTION

Packetized data communication is now being used in a wide variety of applications, which includes such diverse elements as data communication, control information, and digitized/packetized voice. As a result, conflicting demands are being placed on packet switches in order to handle such diverse traffic. An example of such diverse packet streams is shown in the context of FIG. 1, wherein a code division multiple access (CDMA) cellular communication system is illustrated in block diagram. A CDMA system transmits/ receives data at the relatively slow rate of approximately 8 Kbps over a spread spectrum signal between a mobile unit and a cell site. A transceiver at the cell site sends/receives the spread spectrum signal and translates the content of the signal into packets. A speech processor then translates the packets into a digital 64 Kbps pulse code modulated (PCM) stream, as used in standard digital switching.

FIG. 1 illustrates such a system in the context of U.S. Pat. Nos. 5,363,309, and 5,438,565, which are both owned by the assignee of the current application, and are incorporated herein by reference. In this illustration, there is a central office switch 1, which is connected to a public switched telephone network (PSTN) 3, a telephone 4, and a plurality of CDMA cell sites 5–11. CDMA cell sites 5–11 send and receive spread spectrum signals and translate the signals to/from the packetized stream. CDMA cell sites 5–11 are connected to switch 1 via a plurality of trunks 13–19, connected to an equal number of digital facility interfaces (DFI) 21–27 at switch module (SM) 33 of switch 1. DFI's 21–27 provide termination of the digital trunks to and from cell sites 5–11, as is known in the art, and, therefore, will not be discussed further. Executive call processor (ECP) network 29 connects to switch 1 in cell sites 5–11 for exchange of control data via DFI 30, as is known in the art, and described in *The Bell System Technical Journal*, vol. 58, number 1, January, 1979.

Switch 1 is illustratively a distributed control, ISDN electronic telephone system, such as the system disclosed in U.S. Pat. No. 4,592,048, Beckner, et al., which issued May 27, 1986. Alternatively, switch 1 may be a distributed control digital switch such as a 5ESS® switch manufactured by AT&T Corp. and described in *The AT&T Technical Journal*, vol. 64, number 6, July/August, 1985, pages 1303–1564. The architecture of switch 1 includes communication module 31 as a hub, with switch module 33, other switching modules (not shown for clarity), and administration module 35 emanating therefrom. Switch module 33 terminates analog and/or digital subscriber lines through line units, such as line unit 37, and analog or digital trunks through trunk units, such as trunk unit 39. Line unit 37 provides communication with telephone 4 via line 41. Trunk unit 39 provides communication with public switched telephone network (PSTN) 3 via trunks 43. Administration module 35 provides coordination of the functional components of switch 1 and human/machine interface.

Switch module 33 includes a switch module processor (SMP) 44, a timeslot interchange unit (TSIU) 45 and packet switch unit 47. SMP 44 provides control and coordination of the various components of switch module 33. TSI unit 45 provides interchange of 64 Kpbs PCM or 64 Kbps clear channel among the units in switch module 33. Switch module 33 may also contain other units, but, for purposes of clarity, these other units are not shown.

Packet switch unit (PSU) 47 includes packet interface 48, packet handlers 49–55, and speech processors 57 and 59, which are all connected to packet bus 61. There may be other units performing similar (or even dissimilar) functions connected to packet bus 61, but these are not shown for clarity. Packet interface 48 communicates with SMP 44 to provide configuration and control information to the other components in PSU 47. Packet handlers 49–55 perform a frame relay function; that is, they receive packets from cell sites 5–11 and a delivery address from executive control processor (ECP) 29, and relay the packets onto a packet bus 61. Speech processors 57 and 59 "listen" to packets on packet bus 61 (by reading address headers), determine which packets are for themselves, buffer them, and translate these packets into switchable 64 Kbps PCM. In the reverse direction, speech processors 57 and 59 receive 64 Kbps PCM uncoded speech, translate it into CDMA packets, add a two-part address, and send the packets out on bus 61.

According to this system, a mobile telephone in car 54 initiates a CDMA call in cell 5, which call is then set up over radio channels between mobile 54 and cell site 5. A speech processor 57 at switch 1, in this example, is assigned to the call and its address is given to cell site 5. As signals arrive at cell site 5, they are packetized. Packets are multiplexed into packet pipes, which are themselves multiplexed and then sent over trunk facility 13. DFI 21 receives the multiplexed trunk facility 13, then demultiplexes the packet pipes and sends the packet pipes to packet handler 55 on a path through TSIU 45 that is semi-permanently set up ("nailed up") between DFI 21 and packet handler 55. As packets arrive through TSIU 45 to packet handler 55, packets are demultiplexed from the packet pipes and placed on packet bus 61. Packets are then received by speech processor 57. Speech processor 57 accepts all packets for itself and performs a conversion to 64 Kbps PCM. Speech processor 57 is connected through TSIU 45 to line unit 37, to telephone 4 (alternatively through trunk unit 39 to PSTN 3).

In this system, packet handler 55 receives a CDMA packet stream from TSIU 45. From cell site 5, such packet stream is "polled," in that packet handler 55 periodically checks to determine if there are any CDMA packets to process from cell site 5. Additionally, packet handler 55 also has packets delivered to it from packet bus 61. Packets arriving from packet bus 61 cause an interrupt to be generated. Further, as will be discussed below, communication between packet handler 55 and packet interface 48 is an interrupt-driven packet stream. Thus, both interrupt-driven packet streams are serviced by packet handler 55 before the CDMA packet stream, which causes the CDMA packet stream to become overloaded by delaying the CDMA packet stream to an unacceptable degree. CDMA packets are very time sensitive, because they contain digitized voice samples. If many of these digitized voice samples are lost or delayed, the voice call looses quality and may ultimately be torn down because of timeouts, etc. Therefore, it is critical that the voice packets be handled in a timely manner. However, given the nature of interrupts, packets that work on an interrupt basis may cause the polled CDMA packets to be delayed.

Therefore, a problem in the art is that interrupt-driven packets may cause unacceptable delays in processing polled packets.

SUMMARY OF THE INVENTION

This problem is solved and a technical advance is achieved in the art by a system and method that controls potential overload of packet switches when the packet switch has multiple packet streams with different priority levels. In accordance with this invention, a counter is associated with the higher priority packet stream, so that when the counter reaches a predetermined number, the higher priority packet stream is disabled, so that the lower priority packet stream may be processed. Advantageously, the counter may be set to a predetermined value and then decremented, so that when the counter reaches zero, the higher priority packet stream is disabled. Advantageously, a predetermined number of lower priority packets are processed before processing is re-enabled on the higher priority packet system and the counter reset. Advantageously, when the higher priority packet stream is interrupt-driven, interrupts are disabled and then enabled after a predetermined number of packets are processed from the lower priority stream.

A counter may also be associated with the lower level priority streams, wherein the counter may advantageously be decremented until it reaches zero, and then a determination is made to insure that interrupts are enabled. Such systems provide control of the packet streams which avoid overload due to failure or delay in processing low priority packets while providing increased performance and little or no hardware and software changes.

BRIEF DESCRIPTION OF THE DRAWING

A more complete understanding of the invention may be obtained from consideration of the following description in conjunction with the drawings, in which.

DETAILED DESCRIPTION

Figure 1:
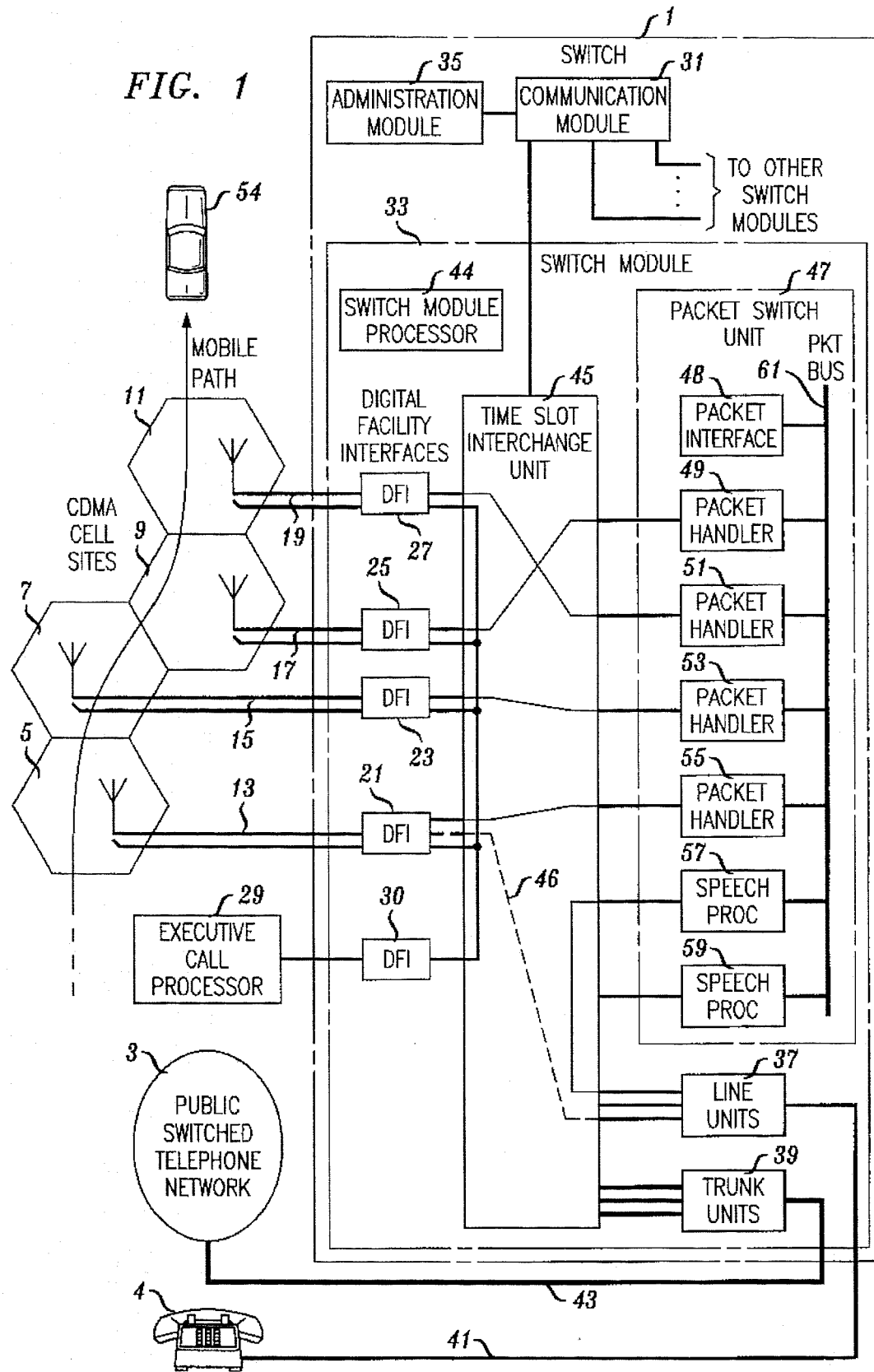
FIG. 1 is a block diagram of a code division, multiple access, wireless telecommunication network, wherein an exemplary embodiment of this invention is used to interface packetized data from cell sites to the packet switch unit.
Figure 2:
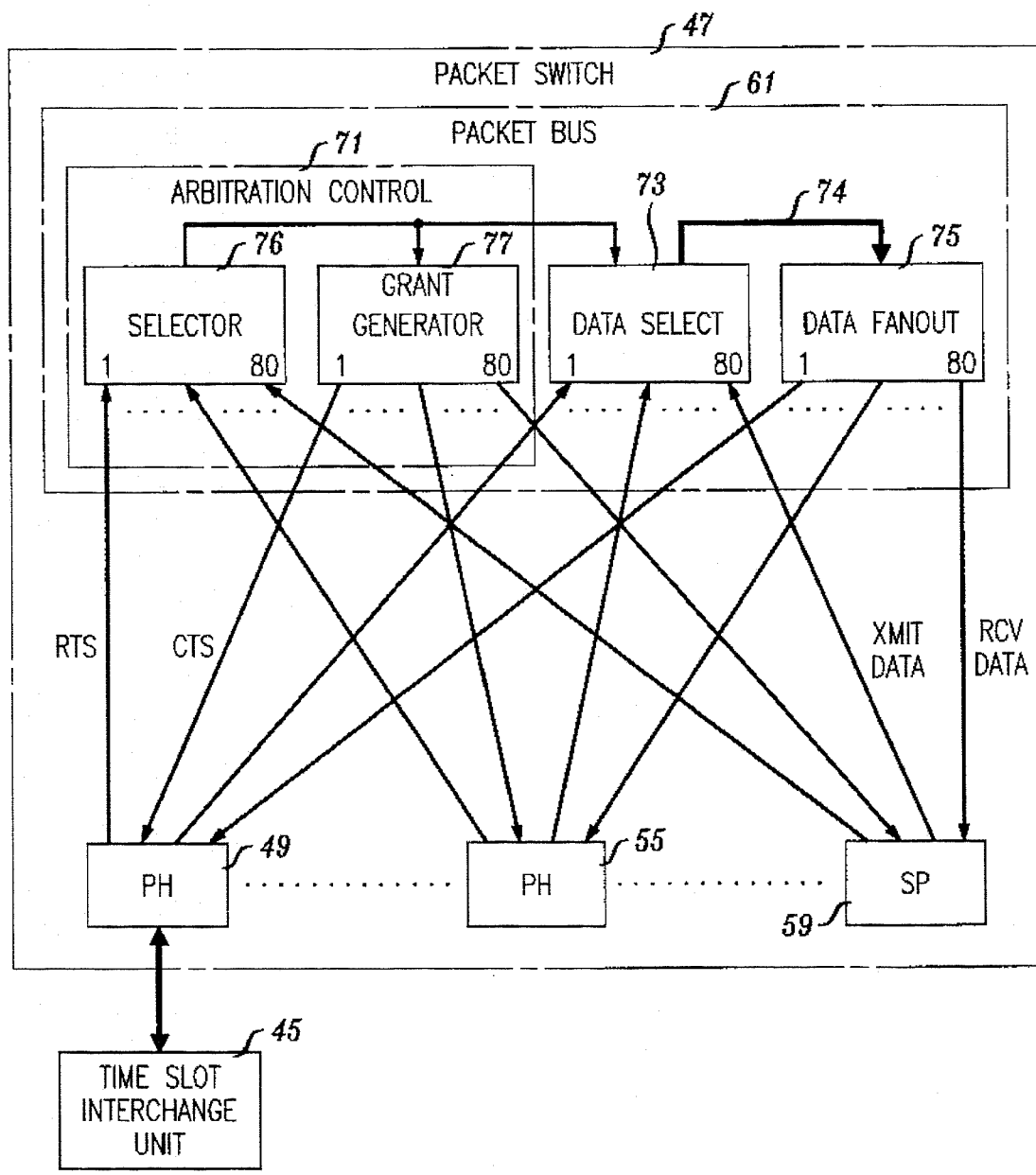
FIG. 2 is a block diagram of a packet switch unit of FIG. 1.

FIG. 2 illustrates a packet switch 47 as shown in FIG. 1. Packet switch 47 comprises a packet bus 61, one or more packet handlers as represented by 49 and 55, and one or more speech processors, as represented by 59. Packet handler 49, as shown in FIG. 1, connects packet switch 47 to time slot interchange unit 45. Packet handler 49 receives packets from and delivers packets to TSIU 45.

Packet bus 61 comprises arbitration control 71, data select 73, data bus 74, and data fanout 75. Packet bus 61 is connected to each one of the elements in packet switch 47 by a request-to-send line, a clear-to-send line, a transmit data bus, and a receive data bus. Arbitration control comprises a selector 76, which receives request-to-send signals from each of the elements. Selector 76 is connected to grant generator 77, which sends a clear-to-send signal to the one of the plurality of units connected to packet bus 61. Selector 76 is also connected to data select 73, which receives data on transmit data buses from each of the units and selects data from the one unit, as determined by selector 76, to put on bus 74. Data fanout 75 receives data from bus 74 and delivers the data to each of the receive data buses connected to each of the units.

Figure 3:
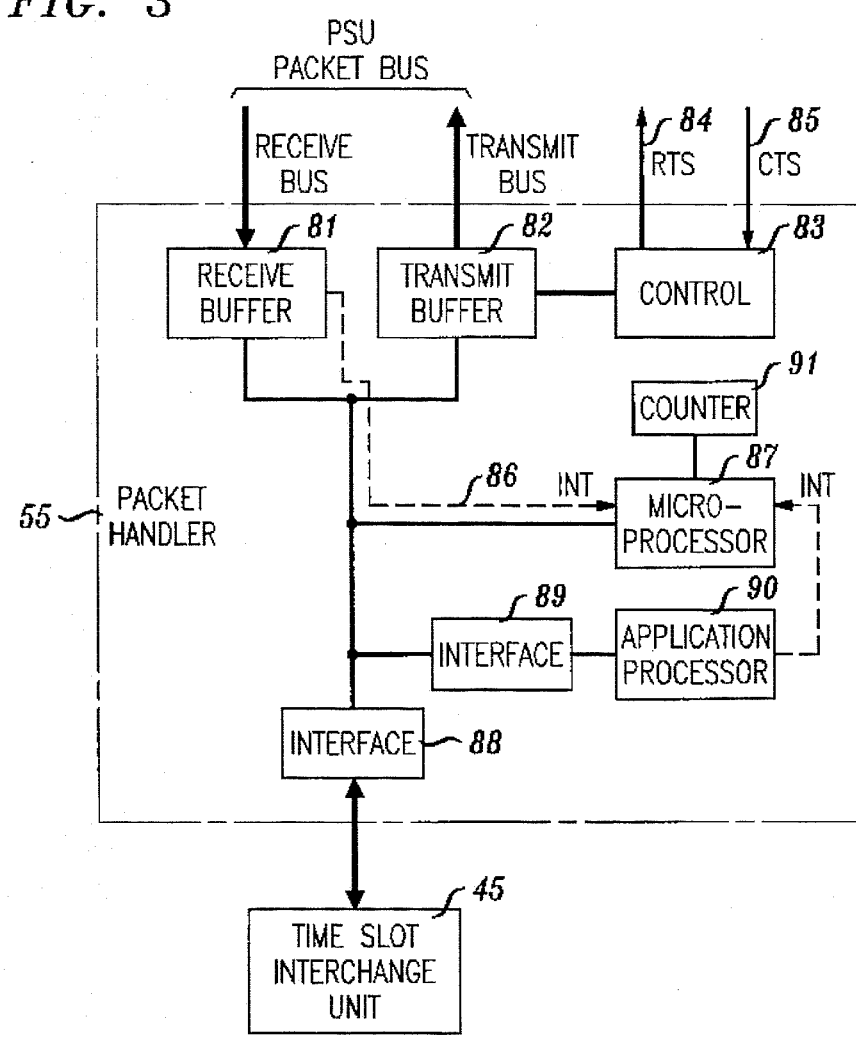
FIG. 3 is a block diagram of a packet handler of FIG. 1 incorporating an exemplary embodiment of this invention.

Turning now to FIG. 3, a packet handler, according to the exemplary embodiment of this invention is shown. Packet handler includes a receive buffer 81 for receiving packets over a Receive Bus and a transmit buffer 82 for storing packets before they are transmitted to a Transmit Bus. Packet handler 55 also includes a control circuit 83, connected to transmit buffer 82, which determines when the transmit buffer has one or more packets to transmit. When control 83 determines that there is a packet to transmit in transmit buffer 82, it asserts a request-to-send lead 84, which is connected to selector 76 (FIG. 2). When selector 76 grants the request to packet handler 55, selector 76 asserts a signal on the clear-to-send line 85. Clear-to-send signals, responsive to the request-to-send signal, are received at control 83, which causes transmit buffer 82 to transmit one or more packets on Transmit Bus.

Receive buffer 81 receives packets from data fanout 75 (FIG. 1). An interrupt is generated every time receive buffer 81 receives a packet via receive bus 86 to microprocessor 87. Microprocessor 87 then causes packets in receive buffer 81 to be moved into interface 88 if it is a CDMA packet or interface 89 if destined for application processor 90, which prepares the data for moving into time slot interchange unit 45. Interface 88 also receives data from TSIU 45 and moves them to transmit buffer 82. Application processor interface 89 receives messages from switch module processor 44 (FIG. 1) and buffers messages for SMP 44. These messages are used by application processor 90 for configuration and status information from packet handler 55.

Polled packets (CDMA) from TSIU 45 to transmit buffer 82 are time critical, and thus must be processed on a regular basis. Receive buffer 81 also carries control information to applications processor interface 89; this information is not time critical. When application processor 90 sends a message, it places a packet in interface 89 and sends an interrupt to microprocessor 89; this information is also not time critical.

Both interface 88 and transmit buffer 82 can become overloaded. In one direction, that is the direction of interface 88, receive buffer 81 receives CDMA voice sample data and also messages for the application processor 90. Processing of the packet stream for application processor interface 89 takes much longer than loading interface 88. Thus, excessive traffic from receive buffer 81 to application processor interface 89 causes excessive delay of the packet stream from receive buffer 81 to interface 88. Therefore, if there are many packet messages for application processor interface 88, the CDMA message voice sample data stream will become delayed or "overloaded," which can cause the call to be torn down. In the opposite direction, data from the TSIU 45 is moved to interface 88 and then to transmit buffer 82. Messages from interface 89 also move to transmit buffer 82. Application processor 90 interrupts microprocessor 87 and, thus, take priority. However, the CDMA voice sample packet stream from interface 88 becomes bogged down and, thus, the call tom down if there are many messages on application processor interface 89. Thus, a control of the interrupting data flow must be achieved in order to maintain an adequate stream of the critical packet data.

According to the exemplary embodiment of this invention, for packets moving from interface 88 to transmit buffer 82, a counter 91 is associated with the high priority, interrupt-driven path in microprocessor 87. Each time a high priority (interrupt-driven) packet is processed and a low priority packet is present for processing, counter 91 is decremented. When this counter's value reaches zero, interrupts in the high priority path are disabled, which halts packet processing in the high priority path, and, thus, only packet processing in the low priority path is permitted. The counter is reset and interrupts are enabled only when a predetermined, minimum number of low priority packets have been processed, or if there are no more low priority packets to process. According to an exemplary embodiment of this invention, at least four packets must be processed from interface 88 (based on determination of the width of the packet pipes which feed interface 88).

Therefore, as long as the counter's value is not zero, the system performs as a strict (preemptive) priority system. Once the counter's value reaches zero, the low priority path temporarily becomes the high priority path. The delay characteristics are controlled by the counter's maximum value; the higher the value, the greater the bias to give preferential treatment to the high priority path. A lower value will bias the system to give better treatment to the low priority path. The selection of this maximum value is of great importance. In the given embodiment, the value was determined via extensive simulation under extreme conditions.

By use of this unique counter, there is no explicit need to measure occupancy delay or queue lengths. Most prior art procedures for determining if a system is overloaded (that is, excessive delay in processing the lower priority streams), makes use of an explicit estimate of real time usage or counts the number of buffers which are being used. The prior art system based on predetermined thresholds determines whether the system is overloaded, and if it is, determines what action to take. Such procedures are not acceptable in scenarios such as the one described in the Background of the Invention section, because any additional processing further delays already delayed voice sample packets far beyond any timeout time (causing the call to be torn down). Further, any changes in the parameters of any of the components of the packet handler 55, such as CPU speed, memory cycle time, etc., will require redesign of the thresholds. Therefore, this invention solves the problem of granting appropriate priority to low priority voice packets without causing major redesign of any system, and without extensive hardware or software changes.

Figure 4:
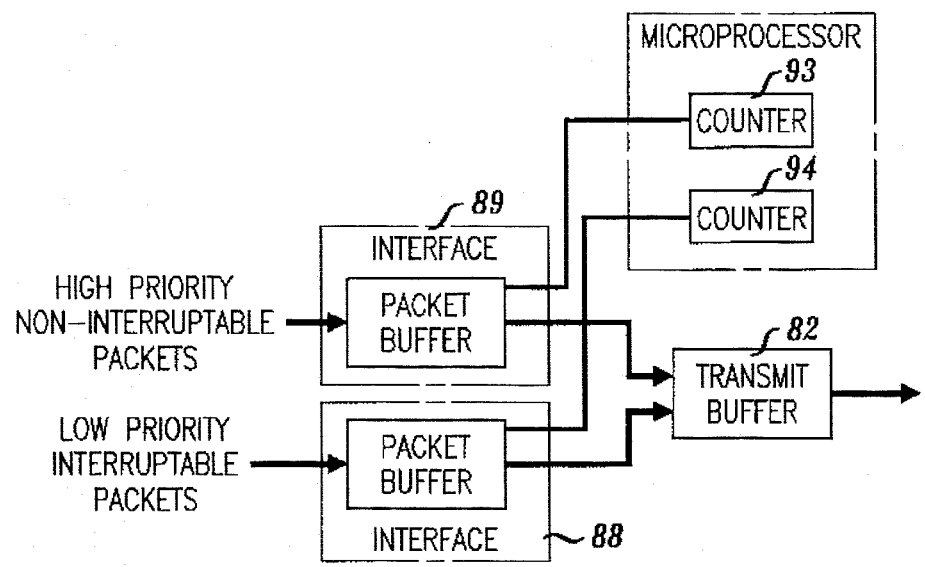
FIG. 4 is a conceptual diagram or queuing model according to this invention.

Turning now to FIG. 4, a block diagram is shown, illustrating the flow of packets in the direction of interface 88 and application processor interface 89 to transmit buffer 82. A counter is associated with each of the two interfaces 88 and 89 in this embodiment of this invention. High priority, non-interruptible packets arrive from application processor interface 89, and a counter 93 is associated with interface 89. The low priority, interruptible packets are, for example, packets from the TSIU via interface 88. Counter 94 is associated with interface 88. Since an object of this invention is to process both high priority and low priority packets without blocking either packet stream, when a packet is received at high priority queue 89, and processed through microprocessor 87, microprocessor 87 decrements counter 93. If counter 93 reaches zero, microprocessor 87 disables interrupts and removes packets from low priority, interruptible buffer in interface 88. As packets are being removed from interface 88, counter 94 is decremented. If counter 94 reaches zero, interrupts are re-enabled and both counters are reset. Thus, a balance is maintained between high priority packets and low priority packets, maintaining both the maintenance and command communication packet stream, and the data stream of CDMA voice sample packets.

Figure 5:
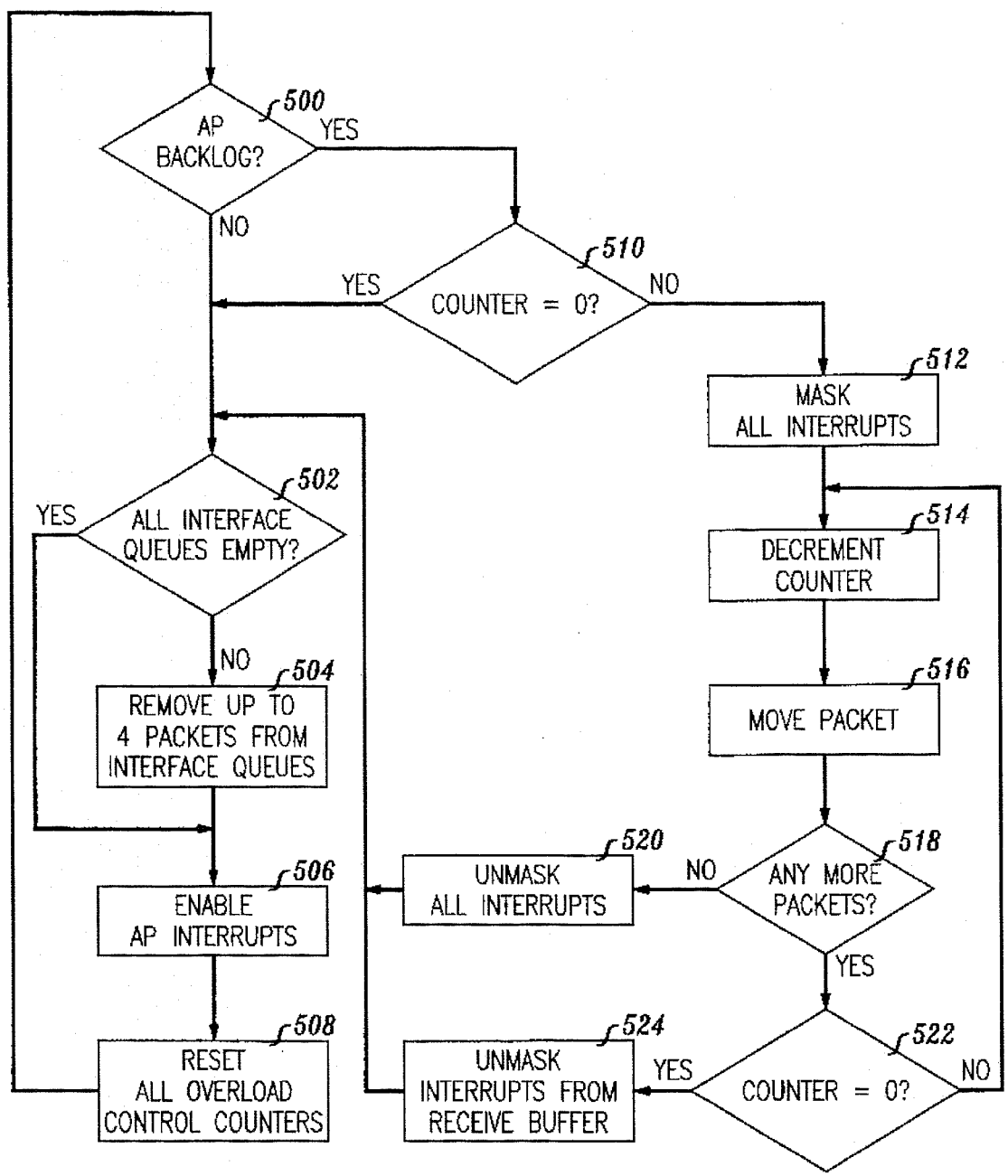
FIGS. 5–7 are flow charts of processing in the packet handler of FIG. 3 according to an exemplary embodiment of this invention.

Turning now to FIG. 5, background (or "normal") processing is shown as it occurs in the packet handler 49, according to the exemplary embodiment of this invention. Processing starts in decision diamond 500, where a determination is made if there are packets waiting at application interface 89. If there is not, then processing continues to decision diamond 502, where a determination is made if interface 88 buffer is empty. If there is at least one packet to be processed, then processing continues to box 504, where up to four packets are removed from the interface 88 buffer. Processing from both decision diamond 502 and action box 504 proceeds to action box 506, where interrupts for the application processor are enabled, and processing continues to action box 508, where all overload control counters are reset. Processing then loops back to decision diamond 500.

If it is determined that there is an application processing backlog in decision diamond 500, then processing moves to decision diamond 510, where a determination is made if the application processor to bus overload control counter equals zero. If it does, then processing continues to decision diamond 502. If it does not, then processing continues to action box 512, where all interrupts are disabled. Processing then continues to action box 514, where the application processor counter is decremented. Processing continues to action box 516, where an application processor packet is moved from interface 89 buffer to the transmit buffer.

Processing then continues to decision diamond 518, where a determination is made if there are any more packets. If there are no more packets, then processing continues to box 520, where interrupts are enabled (unmasked). Processing then continues to decision diamond 502.

If there are more packets to process in decision diamond 518, then processing continues to decision diamond 522, where a determination is made if the counter equals zero. If the counter does not equal zero, then processing loops back to action box 514. If, in decision diamond 522, the overload count does equal zero, then processing moves to action box 524, where interrupts from the receive buffer are enabled (unmasked). Processing continues to decision diamond 502.

Figure 6:
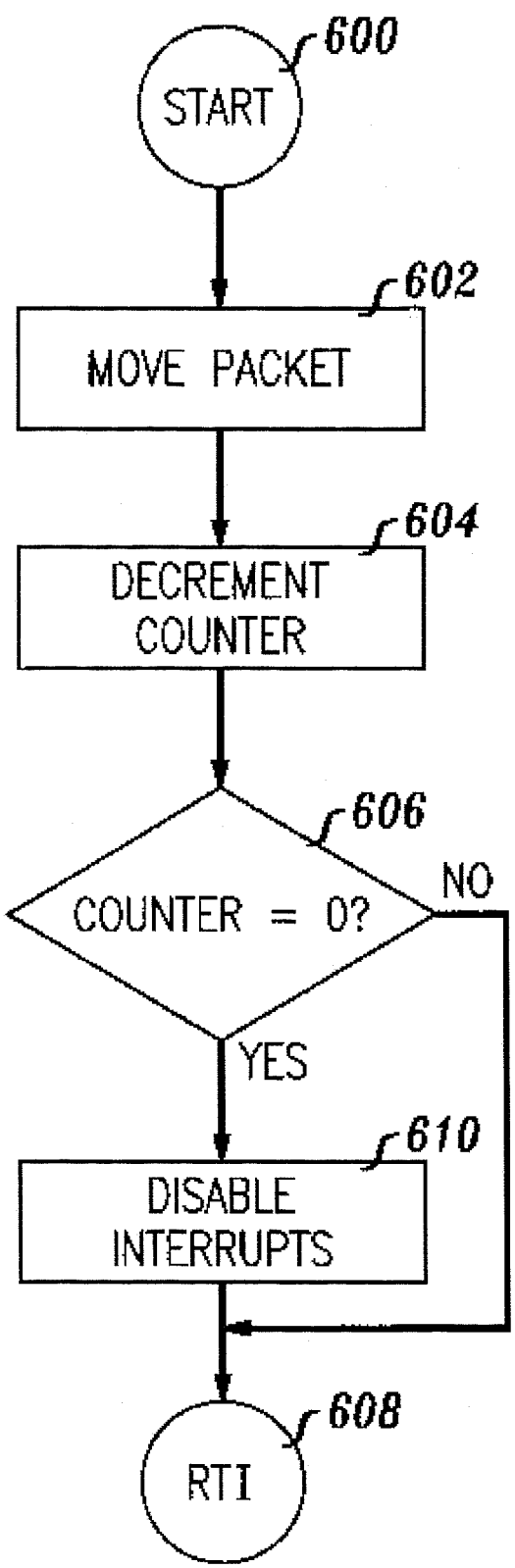

Turning now to FIG. 6, processing after receiving an application processor interrupt is shown. Processing starts in circle 600 and moves to action box 602 where a packet is moved from the application processor interface 89 to transmit buffer 82. Processing continues to action box 604, where the counter is decremented. Processing then continues to decision diamond 606, where a determination is made if the counter is equal to zero. If it is not, then processing returns from interrupt at 608. If the counter is equal to zero, then processing continues to action box 610, where interrupts are disabled. Processing returns from interrupt at 608.

Figure 7:
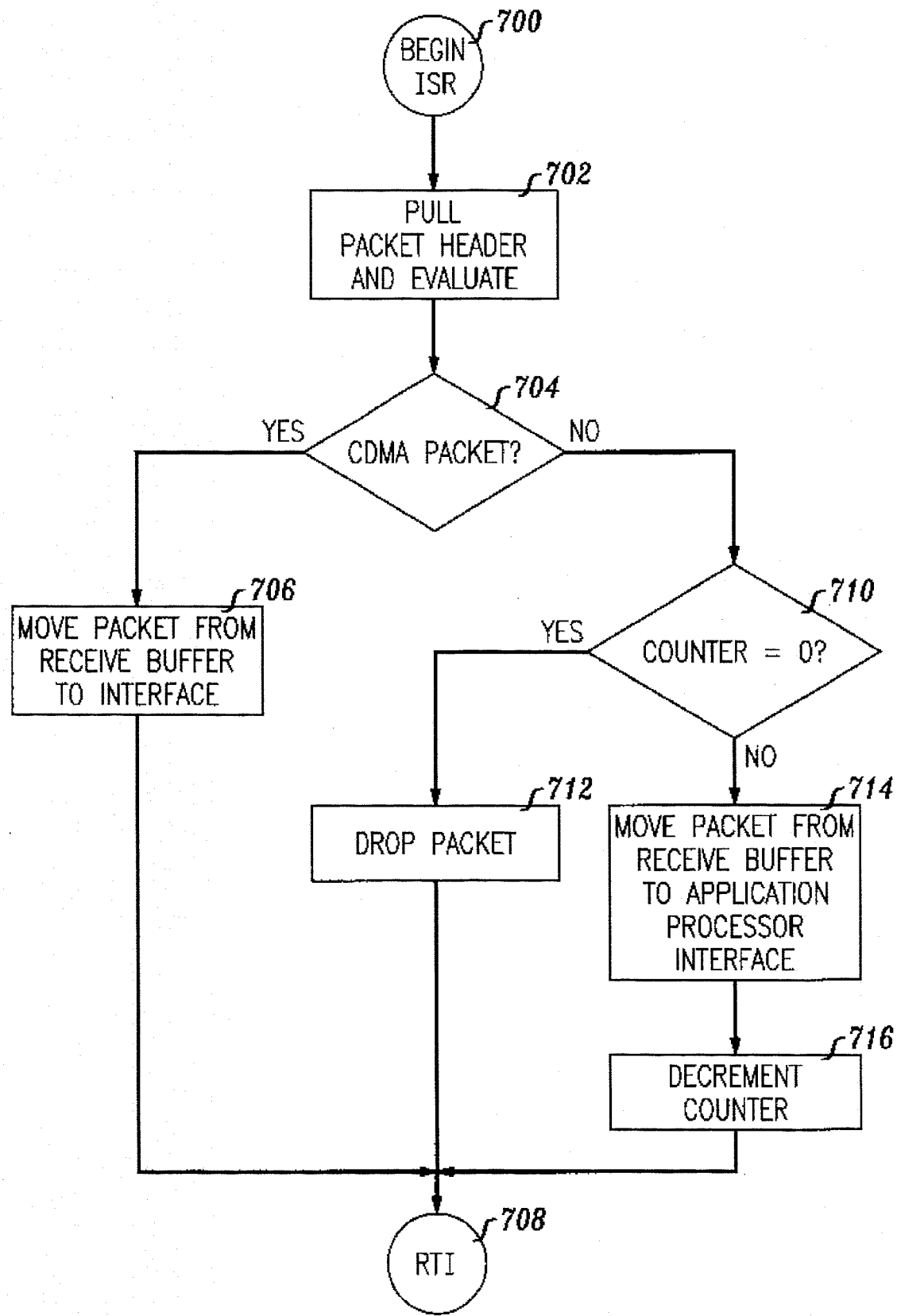

Turning now to FIG. 7, receive buffer interrupt processing is shown. Processing begins in circle 700, and moves to action box 702, where the header of the packet is examined. Processing continues to decision diamond 704, where a determination is made if the packet includes voice samples. If the packet does include voice samples, then processing moves to action box 706, where the packet is moved from the receive buffer 81 to interface 88. Processing then continues to the return from interrupt 708.

If, in decision diamond 704, the packet does not contain voice samples, then processing continues to decision diamond 710, where a determination is made if the counter is equal to zero. If the overload counter is equal to zero, then the system is in "overload," and processing continues to action box 712, where the packet is dropped and processing continues to the return from interrupt circle 708. If, in decision diamond 710, the counter is not equal to zero, then the packet is moved from receive buffer 81 to the application processor interface 89 in action box 714. Processing then continues to action box 716, where the overload counter is decremented and processing then returns from interrupt at circle 708.

Figure 8:
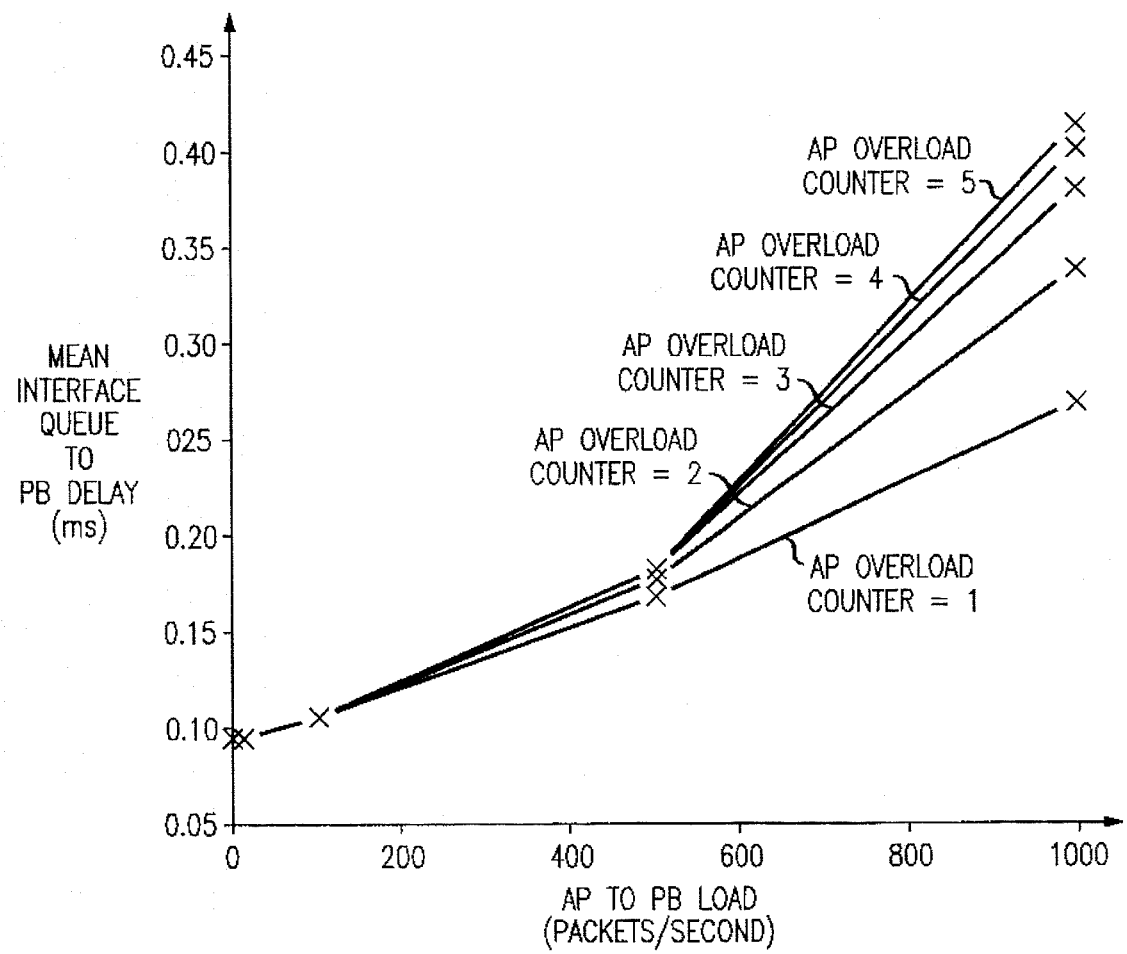
FIG. 8 is a graph of mean delay of packets using the exemplary embodiment of this invention.

Turning now to FIG. 8, a performance graph of delay overload is shown. Each of the lines on the graph shows a different predetermined number in the overload counter. The lowest line shows the overload counter set to one, wherein an optimum balance of AP processing versus CDMA packet processing delay is shown. Thus, by setting the predetermined number of the counter to a low value, when the AP load increases, the CDMA packet stream from interface 88 to transmit buffer 82 is tolerable to the CDMA timing constraint.

It is to be understood that the above-described embodiments are merely illustrative principles of the invention and that many variations may be devised by those skilled in the art, without departing from the scope of the invention. For example, if the application processor processes ISDN tasks, a mechanism according to this invention can be used to achieve balanced performance. It is, therefore, intended that such variations be included within the scope of the claims.

I claim:

1. A system for controlling overload for use in a packet processing system, said system comprising:

a polled packet stream;

an interrupt-driven packet stream that generates an interrupt when a packet is available for processing;

a counter associated with said interrupt-driven packet stream;

a common destination for packets from both said interrupt-driven packet stream and said polled packet stream; and control means for processing packets from both said interrupt-driven packet stream and said polled packet stream by processing packets from said polled packet stream and preempting processing of packets from said polled packet stream when an interrupt is received from said interrupt-driven packet stream in order to process packets from said interrupt-driven packet stream and for delivering said packets to said common destination, wherein said processing includes decrementing said counter each time said control means receives a packet from said interrupt-driven packet stream, and, when said counter reaches a predetermined number, disabling interrupts so that said interrupt-driven packet stream stops preempting said polled packet stream and processing a predetermined number of packets from said polled packet stream before resetting said counter and allowing interrupts from said interrupt-driven packet stream to preempt delivery of packets from said polled packet stream again.

2. A system for controlling overload according to claim 1 further including a second counter associated with said polled packet stream, wherein said control means decrements said second counter when it processes a packet from said polled packet stream, and, when said counter reaches said predetermined number, allowing interrupts.

3. A system for controlling overload according to claim 1 wherein said interrupt-driven packet stream comprises a plurality of packet streams, and wherein said counter comprises a plurality of counters, one for each packet stream.

4. A system for controlling overload according to claim 3 wherein said control means disables interrupts for all interrupt-driven packet streams when one of said plurality of counters reaches said predetermined number.

5. A system for controlling overload according to claim 3 wherein, when one of said plurality of counters reaches said predetermined number, said control means disables interrupts for the interrupt-driven packet stream associated with said counter.

6. A method for controlling overload for use in a packet processing device, said packet processing device receiving packets from a plurality of sources, at least one of said plurality of sources providing an interrupt when there is a packet to be processed and at least one other of said plurality of sources being polled, said method comprising the steps of:

processing packets from said interrupt source responsive to an interrupt wherein said processing includes preempting processing of packets from said polled source;

decrementing a counter for each packet processed which is associated with said interrupt source;

responsive to said counter reaching a predetermined number, disabling interrupts so that packets associated with said interrupt source are not processed;

processing at least one packet from said polled packet source;

resetting said counter; and enabling interrupts and repeating the steps of processing packets from said interrupt source responsive to an interrupt, decrementing said counter and disabling interrupts when said counter reaches said predetermined number.

7. A method according to claim 6 wherein said step of processing at least one packet from said polled packet source comprises processing a predetermined number of packets, said predetermined number comprising sufficient packets to avoid overload at said polled source.

8. A method according to claim 6 further including the step of:

processing a packet from said polled source;

decrementing a counter associated with said polled source; and responsive to said counter reaching a predetermined number, enabling interrupts.

9. A method according to claim 6 wherein said step of disabling interrupts disables interrupts from all interrupt sources.

10. A method according to claim 6 wherein said step of disabling interrupts disables interrupts for only said interrupt source.

* * * * *